(12) United States Patent
Xu et al.

(10) Patent No.: US 11,170,502 B2
(45) Date of Patent: Nov. 9, 2021

(54) METHOD BASED ON DEEP NEURAL NETWORK TO EXTRACT APPEARANCE AND GEOMETRY FEATURES FOR PULMONARY TEXTURES CLASSIFICATION

(71) Applicant: Dalian University of Technology, Dalian (CN)

(72) Inventors: Rui Xu, Dalian (CN); Xinchen Ye, Dalian (CN); Lin Lin, Dalian (CN); Haojie Li, Dalian (CN); Xin Fan, Dalian (CN); Zhongxuan Luo, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/649,650

(22) PCT Filed: Jan. 7, 2019

(86) PCT No.: PCT/CN2019/070588
§ 371 (c)(1),
(2) Date: Mar. 21, 2020

(87) PCT Pub. No.: WO2019/174376
PCT Pub. Date: Sep. 19, 2019

(65) Prior Publication Data
US 2020/0258218 A1  Aug. 13, 2020

(30) Foreign Application Priority Data
Mar. 14, 2018 (CN) .......................... 201810206846.9

(51) Int. Cl.
*G06T 7/41* (2017.01)
*G06N 3/08* (2006.01)
(Continued)

(52) U.S. Cl.
CPC ............. *G06T 7/0012* (2013.01); *G06N 3/04* (2013.01); *G06N 3/08* (2013.01); *G06T 7/41* (2017.01);
(Continued)

(58) Field of Classification Search
CPC combination set(s) only.
See application file for complete search history.

(56) References Cited

U.S. PATENT DOCUMENTS 5,873,824 A * 2/1999 Doi ....................... G06T 7/0012
                                                       600/408
10,970,887 B2 * 4/2021 Wang ................... G06N 3/0472
(Continued)

FOREIGN PATENT DOCUMENTS

| CN | 106530296 A | 3/2017 |
| CN | 106650830 A | 5/2017 |
(Continued)

OTHER PUBLICATIONS

Aryan et la "Adaptive and Robust Lung Cancer Screening Using Memory-Augmented Recurrent Networks" Sep. 7, 2018 (Year: 2018).*

(Continued)

*Primary Examiner* — Tsung Yin Tsai
(74) *Attorney, Agent, or Firm* — Muncy, Geissler, Olds & Lowe, P.C.

(57) ABSTRACT

Provided is a method based on deep neural network to extract appearance and geometry features for pulmonary textures classification, which belongs to the technical fields of medical image processing and computer vision. Taking 217 pulmonary computed tomography images as original data, several groups of datasets are generated through a preprocessing procedure. Each group includes a CT image patch, a corresponding image patch containing geometry (Continued)

information and a ground-truth label. A dual-branch residual network is constructed, including two branches separately takes CT image patches and corresponding image patches containing geometry information as input. Appearance and geometry information of pulmonary textures are learnt by the dual-branch residual network, and then they are fused to achieve high accuracy for pulmonary texture classification. Besides, the proposed network architecture is clear, easy to be constructed and implemented.

1 Claim, 4 Drawing Sheets

(51) Int. Cl.
*G06T 7/00* (2017.01)
*G06N 3/04* (2006.01)
(52) U.S. Cl.
CPC .............. *G06T 2207/10081* (2013.01); *G06T 2207/20081* (2013.01); *G06T 2207/20084* (2013.01); *G06T 2207/30061* (2013.01)

(56) References Cited

U.S. PATENT DOCUMENTS

| | | | | |
|---|---|---|---|---|
| 2003/0194124 | A1* | 10/2003 | Suzuki | G06T 7/0012 382/156 |
| 2005/0207630 | A1* | 9/2005 | Chan | A61B 6/583 382/131 |
| 2016/0275678 | A1* | 9/2016 | Onal | G06K 9/4642 |
| 2019/0213451 | A1* | 7/2019 | Schafer | G06N 3/08 |
| 2020/0302596 | A1* | 9/2020 | Yoo | G06T 7/11 |

FOREIGN PATENT DOCUMENTS

| | | |
|---|---|---|
| CN | 107016665 A | 8/2017 |
| CN | 108428229 A | 8/2018 |

OTHER PUBLICATIONS

Chung et al "Learning Deep Representations of Medical Images using Siamese CNNs with Application to Content-Based Image Retrieval" Dec. 27, 2017 (Year: 2017).*
Benhur, Sean J "A friendly introduction to Siamese Networks" Sep. 2, 2007 (Year: 2007).*
Christodoulidis (Multisource Transfer learning with convolutional neural networks for lung pattern analysis; IEEE Journal of biomedical and health informatics vol. 21, No. 1, Jan. 2017; https://ieeexplore.ieee.org/stamp/stamp.jsp?tp=&arnumber=7776792 (Year: 2017).*
He (Deep Residual Learning for Image Recognition; Dec. 2015; https://arxiv.org/pdf/1512.03385.pdf). (Year: 2015).*
Christodoulidis etal "Multisource Transfer Learning With Convolutional Neural Networks for Lung Pattern Analysis" (Year: 2016).*
He et al "Deep Residual Learning for Image Recognition" (Year: 2015).*

* cited by examiner

| Methods | Accuracy |
|---|---|
| (a) LeNet-5 | 0.7897 |
| (b) Bag-of-Feature | 0.9014 |
| (c) CNN-5 | 0.9025 |
| (d) ResNet-18 | 0.9247 |
| (e) DB-ResNet-18 | 0.9412 |

FIG. 5

(a) Bag-of-Features

|     | CON  | GGO  | HCM  | MGGO | EMP  | NOD  | NOR  |
|-----|------|------|------|------|------|------|------|
| CON | 1812 | 3 | 1 | 55 | 0 | 3 | 3 |
| GGO | 140 | 2244 | 2 | 144 | 5 | 10 | 12 |
| HCM | 0 | 3 | 2594 | 133 | 0 | 0 | 0 |
| MGGO | 112 | 332 | 92 | 1804 | 0 | 15 | 0 |
| EMP | 0 | 0 | 12 | 0 | 2402 | 20 | 16 |
| NOD | 1 | 23 | 0 | 2 | 0 | 2200 | 567 |
| NOR | 0 | 4 | 0 | 2 | 0 | 58 | 3130 |

(b) CNN-5

|     | CON  | GGO  | HCM  | MGGO | EMP  | NOD  | NOR  |
|-----|------|------|------|------|------|------|------|
| CON | 1876 | 0 | 0 | 1 | 0 | 0 | 0 |
| GGO | 16 | 2188 | 10 | 214 | 13 | 103 | 13 |
| HCM | 0 | 1 | 2674 | 55 | 0 | 0 | 0 |
| MGGO | 6 | 463 | 111 | 1775 | 0 | 0 | 0 |
| EMP | 0 | 17 | 48 | 0 | 2198 | 21 | 166 |
| NOD | 0 | 117 | 0 | 0 | 5 | 2471 | 200 |
| NOR | 0 | 65 | 0 | 0 | 21 | 84 | 3024 |

(c) ResNet-18

|     | CON  | GGO  | HCM  | MGGO | EMP  | NOD  | NOR  |
|-----|------|------|------|------|------|------|------|
| CON | 1877 | 0 | 0 | 0 | 0 | 0 | 0 |
| GGO | 22 | 2006 | 10 | 336 | 34 | 133 | 16 |
| HCM | 0 | 8 | 2634 | 88 | 0 | 0 | 0 |
| MGGO | 25 | 190 | 97 | 2043 | 0 | 0 | 0 |
| EMP | 0 | 0 | 1 | 0 | 2404 | 17 | 28 |
| NOD | 0 | 15 | 0 | 0 | 18 | 2509 | 251 |
| NOR | 0 | 9 | 0 | 0 | 8 | 47 | 3130 |

(d) DB-ResNet-18

|     | CON  | GGO  | HCM  | MGGO | EMP  | NOD  | NOR  |
|-----|------|------|------|------|------|------|------|
| CON | 1875 | 0 | 0 | 0 | 0 | 2 | 0 |
| GGO | 16 | 2199 | 1 | 226 | 47 | 43 | 25 |
| HCM | 0 | 0 | 2617 | 113 | 0 | 0 | 0 |
| MGGO | 3 | 179 | 22 | 2151 | 0 | 0 | 0 |
| EMP | 0 | 3 | 35 | 0 | 2377 | 7 | 28 |
| NOD | 0 | 43 | 3 | 0 | 11 | 2514 | 222 |
| NOR | 0 | 13 | 0 | 0 | 9 | 5 | 3167 |

METHOD BASED ON DEEP NEURAL NETWORK TO EXTRACT APPEARANCE AND GEOMETRY FEATURES FOR PULMONARY TEXTURES CLASSIFICATION

TECHNICAL FIELD

The present invention belongs to the technical fields of medical image processing and computer vision, and relates to using deep neural network framework to extract related features from appearance and geometry information of pulmonary computed tomography (CT) images, and classifies different categories of textures on pulmonary CT images. It is specifically related to a deep neural network based method for extracting appearance and geometry features for pulmonary textures classification.

BACKGROUND

Diffuse lung diseases refer to a group of lung disorders exhibiting widely distributed textures in pulmonary regions on CT images. Since these textures are complex, it is difficult to classify them, even for experienced radiologists. Therefore, it is required to build a computer-aided diagnosis (CAD) system that is able to automatically and more accurately classify the pulmonary textures of diffuse lung diseases. One crucial technology of building such a CAD system is to develop a precise and efficient classification method that can automatically classify pulmonary textures within region-of-interests (ROIs) inside lungs on CT images.

Traditional methods for pulmonary textures classification on CT images are composed of two steps, i.e. the design of strong handcrafted features and training of a discriminative classifier. Due to the relative mature technology of training classifiers, most methods use existing classifiers, such as neural network, support vector machines, K-nearest classifier. Therefore, researchers mainly pay attention to designing handcrafted features that can fully represent pulmonary textures, such as a Bag-of-Feature based method (R. Xu, Y. Hirano, R. Tachibana, and S. Kido, "Classification of diffuse lung disease patterns on high-resolution computed tomography by a bag of words approach," in International Conference on Medical Image Computing & Computer-assisted Intervention (MICCAI), 2011, p. 183.).

In recent years, with the development of deep learning, deep neural networks have brought revolutionary influences on the fields of image processing and computer vision. They unify the two steps of traditional image classification methods, designing feature representations and training classifier, into an end-to-end framework, which can extract and learn effective feature representations from image data directly and apply them into image classification tasks. Based on this pattern, deep learning shows remarkable performance in many fields such as natural image classification and face classification, compared with traditional methods. Recently, deep learning is also implemented in the field of pulmonary textures classification, such as the research using convolutional neural network (CNN) to classify pulmonary textures (M. Anthimopoulos, S. Christodoulidis, and et. al., "Lung pattern classification for interstitial lung diseases using a deep convolutional neural network," IEEE Transactions on Medical Imaging, vol. 35, no. 5, pp. 1207-1216, 2016), which shows slight improvement in pulmonary texture classification.

Although deep learning methods have been applied to classification of pulmonary textures on CT images and have shown improvement in classification accuracy compared with traditional methods, the classification accuracy of pulmonary textures is far from the requirement of clinical diagnosis. The previously proposed CNN based method has two limitations. Firstly, the network is not deep enough to fully exploit the potential capacity of deep learning. Secondly, it extracts features only by exploiting appearance information while ignoring geometry information that is quite helpful to identify some pulmonary textures. Therefore, it is required to develop a new deep learning based method to overcome these limitations.

The present invention provides a novel deep network that can fully exploit appearance and geometry information to produce more discriminative features for pulmonary textures classification. Residual blocks in residual network (Kaiming He, Xiangyu Zhang, and et. al., "Deep residual learning for image recognition," in Computer Vision and Pattern Recognition, 2016, pp. 770-778.) are applied in this method to build a dual-branch residual network with 18 layers. The proposed network includes two branches to learn appearance and geometry features of pulmonary textures separately, and then integrate them efficiently to achieve high performance for the classification of pulmonary textures.

SUMMARY

The present invention aims to overcome limitations of existing methods, and provides a method based on deep neural network to fully exploit appearance and geometry information for pulmonary textures classification. The method includes a network architecture with dual branches that can separately extract features related to appearance and geometry, and then integrate them efficiently to achieve high performance for the classification of pulmonary textures.

The technical solution of the present invention: a method based on deep neural network to extract appearance and geometry features for pulmonary textures classification, comprising the following steps:

1) Original data preparation: the original data includes CT image patches of pulmonary textures, corresponding image patches containing geometry information and corresponding category labels, for training, validation, and testing.

2) Construction of dual-branch residual network: based on skip-connection structure proposed in residual network, a dual-branch residual network with 18 layers is constructed.

3) Train the dual-branch residual network from step (2).

The steps of constructing dual-branch residual network are presented as follows:

2-1) The constructed dual-branch residual network is composed of 18 layers, including 15 convolutional layers and 3 fully connected layers. The top branch uses CT image patches with the size of 32×32×1 (appearance information in image) as input, the bottom branch uses corresponding image patches containing geometry information with the size of 32×32×3 (geometry information in image) as input.

2-2) The skip-connection structure calculates the residual error between the input information and the information calculated by convolutional layer. Through learning residual error, the number of layers in the network can be increased while the problems of gradient vanishment and gradient explosion can be avoided. Therefore, the network can learn efficiently. The residual error is formulated as follows:

$$y = F(x, \{W_i\}) + x$$

In the formulation, y denotes final output result after convolutional layer, F denotes convolutional calculation function, x denotes the input of the network, i denotes the index of convolutional layer with domain of definition set as [1, 15], $W_i$ denotes the weight matrix of i-th convolutional layer obtained from training the network.

2-3) The output of last convolutional layer of the top and bottom branches are directly concatenated after a max-pooling layer to fuse information of top and bottom branches.

2-4) To guarantee that the dual-branched residual network is capable of rotation and translation invariance in image-patch classification, a max-pooling layer is utilized after the first and last convolutional layers.

2-5) To enlarge the receptive field of network, the strides of 6-th, 10-th, and 10-th convolutional layers are set to be 2 (default 1) to implement the 2× down-sampling for enlarging the receptive field of the network.

The steps of training the dual-branch residual network from step 2) are presented as follows:

3-1) Using small batch training model, the network is trained by minimizing the cross entropy that is a loss function to measure the differences between the ground-truth and predicted classification results. Cross entropy is defined as follows:

$$L(y, y') = -\frac{1}{n}\sum_{x}(y' \log(y))$$

where, L(•) denotes value of cross entropy, n denotes the number of samples in a mini-batch of training, which is set to be 30, x denotes the data matrix in a mini-batch of training, Σ denotes summation operation, y' denotes the ground-truth labels of the corresponding x, log(•) denotes logarithm operation, y denotes the network classified labels of the x.

3-2) Use the loss function in step (3-1) to optimize the dual-branch residual network.

The present invention has the following beneficial effects:

The present invention is inspired from deep learning and exploits residual blocks with skip-connection to construct a novel dual-branched residual network that has 18 layers. The inputs of the dual branches are original image patches and the corresponding images patches containing geometry information. The invented network can classify pulmonary textures with high accuracy. This invention has the following characteristics:

1. The invented system is easy to be implemented. Only by preparing original CT image patches and the corresponding image patches containing geometry information, the invented dual-branch residual network can be trained and relatively high classification accuracy can be achieved;

2. The invented method can be easily implemented in programming;

3. Using the skip-connection in residual blocks, the number of layers of the dual-branch residual network is deepened and the network capacity to exploit features can be enhanced under the condition that the network can be trained normally;

4. The invented deep network has a novel architecture of dual branches that respectively explore appearance and geometry information of pulmonary textures and then integrate them to enhance the capacity of classification.

DESCRIPTION OF DRAWINGS

FIG. 5 gives the comparison of classification accuracy between the invention and other methods, wherein (a) classification accuracy of LeNet-5 method; (b) classification accuracy of bag-of-feature based method; (c) classification accuracy of five layers' convolutional neural networks (CNN-5); (d) classification accuracy of a single residual network (ResNet-18); (e) classification accuracy of the method of the present invention (DB-ResNet-18).

FIG. 6 gives confusion matrices of the invented method and other methods, wherein (a) confusion matrix of bag-of-feature based method; (b) confusion matrix of five layers' convolutional neural network (CNN-5); (c) confusion matrix of a single residual network (ResNet-18); (d) confusion matrix of the method of the present invention (DB-ResNet-18).

DETAIL DESCRIPTION

Figure 1:
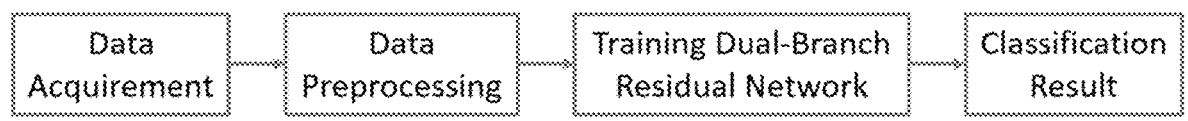
FIG. 1 is a flowchart of the invention.

The present invention provides a method that exploits a deep neural network to extract appearance and geometry features for pulmonary textures classification. Details related to the present invention is described as follows with the combination of the accompanying drawings and the technical solutions:

The present invention constructs a novel dual-branch residual network. It is trained by using CT images of pulmonary textures, and has achieved relative high classification accuracy in testing. The specific implementation process is shown in FIG. 1, and the method includes the following steps:

1) Original data preparation:

1-1) CT images from 217 patients were collected in the experiment. Specifically, CT images captured from 187 patients contained 6 kinds of typical pulmonary textures, including nodular (NOD), emphysema (EMP), honeycombing (HCM), consolidation (CON), ground-glass opacity (GGO) and multi-focal ground-glass opacity (MGGO). CT images captured from the rest 30 patients only exhibited normal pulmonary textures. Image patches of 7 kinds of pulmonary textures were generated using the 217 CT images (including texture of normal tissue).

1-2) Three experienced radiologists were invited to process each of the 217 CT images as follows:

1-2-1) Three axial slices containing typical pulmonary textures were selected from each CT image;

1-2-2) Three radiologists were asked to manually delineate regions of typical pulmonary textures (including textures of diffuse lung diseases and normal pulmonary tissue) on 3 selected axial slices with GUI-based tools;

1-2-3) The intersection of each axial slice annotated by three radiologists was regarded as final annotation result.

Figure 2:
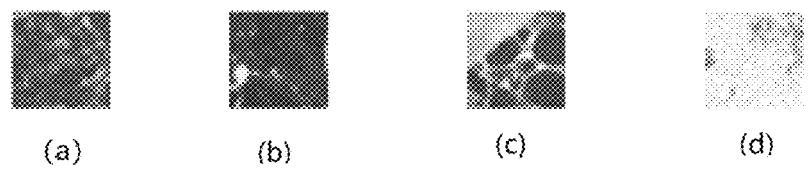
FIG. 2 shows examples of CT image patches of 7 kinds of pulmonary textures, which are (a) nodular, (b) emphysema, (c) honeycombing, (d) consolidation, (e) multi-focal ground-glass opacity, (f) normal tissues and (g) reticular ground-glass opacity.
Figure 3:
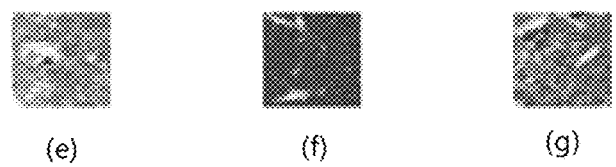
FIG. 3 shows the pulmonary texture, wherein (a) the illustration of CT image patch of pulmonary texture and (b) the corresponding image patches containing geometry information.

1-3) Based on the final annotation results, a scanning window with the size of 32×32×1 was used to sample image patches on corresponding axial slices of CT images. The scanning window was placed on the top left corner of axial slices and slided with a stride of 8 horizontally and vertically. When the center of scanning window was in the annotated regions, regions inside the scanning window was cropped and saved, together with the corresponding category of pulmonary textures. Finally, a series of CT image patches with the size of 32×32×1 were generated for the 7 kinds of typical pulmonary textures. FIG. 2 gives examples of CT image patches of the 7 kinds of pulmonary textures.

1-4) For each pixel of all CT image patches obtained in the step (1-3), a 3×3 Hessian matrix defined as follows was calculated:

$$H(x, y, z) = \begin{pmatrix} \frac{\partial^2 I}{\partial x^2} & \frac{\partial^2 I}{\partial x \partial y} & \frac{\partial^2 I}{\partial x \partial z} \\ \frac{\partial^2 I}{\partial y \partial x} & \frac{\partial^2 I}{\partial y^2} & \frac{\partial^2 I}{\partial y \partial z} \\ \frac{\partial^2 I}{\partial z \partial x} & \frac{\partial^2 I}{\partial z \partial y} & \frac{\partial^2 I}{\partial z^2} \end{pmatrix}$$

where H is the Hessian matrix, ∂ is the calculation of partial derivative, x,y and z are coordinates of three directions with domain of definition of [0, 511]. I denotes the intensity of CT image patches with domain of definition of [0, 255].

Matrix eigenvalue decomposition was performed for the Hessian matrix and 3 eigenvalues can be obtained for each pixel. These eigenvalues were arranged according to the position of corresponding pixel and reconstructed to an image patch with size 32×32×3, which was the corresponding image patch containing geometry information of the original CT image patch.

1-5) Totally 72348 groups of data were acquired from step (1-3) and (1-4), each group included a CT image patch with the size of 32×32×1, an image patch containing geometry information with the size of 32×32×3 and a corresponding ground-truth label of pulmonary textures. 54392 groups were randomly selected as training and validation sets for training and tuning the dual-branch residual network, the rest 17956 groups were the testing set for performance evaluation. Training, validation and testing sets were totally independent.

Figure 4:
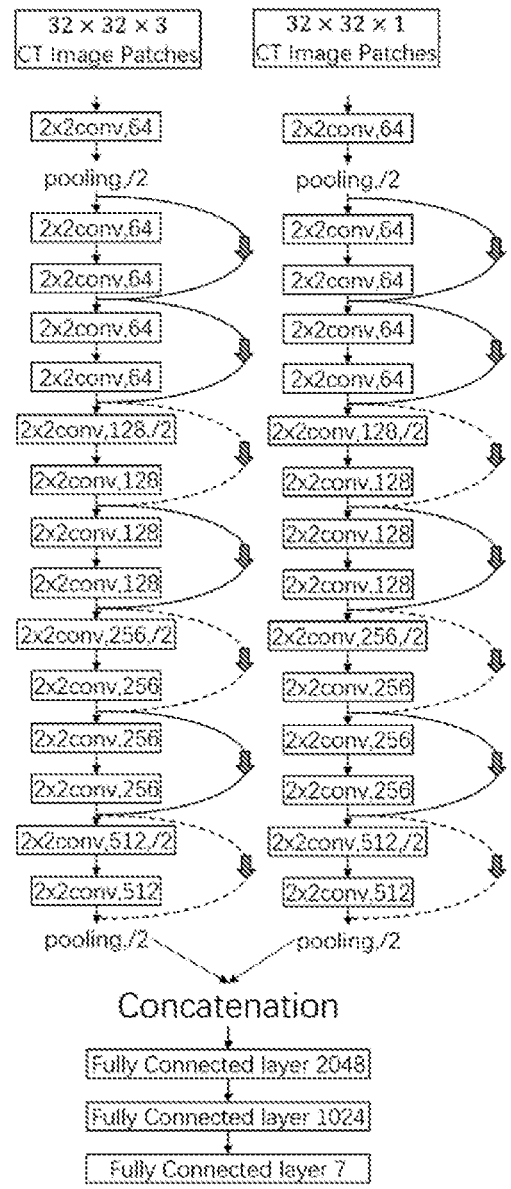
FIG. 4 gives the architecture of the dual branch residual network.

2) Construction of dual-branch residual network: Inspired from skip-connection structure proposed in residual network, a dual-branch residual network with 18 layers was constructed. FIG. 4 gives the details of the network architecture.

2-1) The dual-branch residual network in the invention was composed of 18 layers, including 15 convolutional layers and 3 fully connected layers. The top branch used CT image patches with size 32×32×1 (appearance information in image) as input, the bottom branch used corresponding image patches containing geometry information with size 32×32×3 (geometry information in image) as input.

2-2) The skip-connection structure calculated the residual error between the input information and the information calculated by convolutional layer. Through learning residual error, the number of layers in the network can be increased, the problems of gradient vanishing and gradient explosion can be avoided and the network can learn efficiently. The residual error was formulated as follows:

$$y = F(x, \{W_i\}) + x$$

In the formulation, y denotes final output result of convolutional layer, F denotes convolutional calculation function, x denotes the input of network, y denotes the index of convolutional layer with domain of definition set as [1, 15], $W_i$ denotes the parameter of the i-th convolutional layer obtained from training the network.

2-3) The output of last convolutional layer of the top and bottom branches were directly concatenated after a max-pooling layer to fuse information of top and bottom branches.

2-4) To guarantee the rotation and translation invariance, a max-pooling layer was utilized after the first and last convolutional layers.

2-5) To enlarge the receptive field of network, the stride of 6-th, 10-th, and 10-th convolutional layers were set to be 2 (default 1) to implement the 2×down-sampling for enlarging the receptive field of the network.

3) Training of the dual-branch residual network constructed in the step 2).

3-1) The network was trained by minimizing the cross entropy that was a loss function to measure the differences between the ground-truth and predicted classification results. Cross entropy was defined as follows:

$$L(y, y') = -\frac{1}{n} \sum_x (y' \log(y))$$

where, L(•) denotes value of cross entropy, n denotes the number of samples in a mini-batch of training, which is set to be 30, x denotes the data matrix in a mini-batch of training, Σ denotes summation operation, y' denotes the ground-truth labels of the corresponding x, log(•) denotes logarithm operation, y denotes the network classified labels of the x.

3-2) Use the loss function in step (3-1) to optimize the dual-branch residual network. Network training was stopped when the value of the loss function did not change much in sequential 20 epochs.

The invented method was compared with the other methods by using the testing data set. The comparison results are given in FIG. 5, where (a) is the classification accuracy of LeNet-5 method (Y. Lecun, L. Bottou, Y. Bengio, and P. Haffner, "Gradient-based learning applied to document recognition," Proceedings of the IEEE, vol. 86, no. 11, pp. 2278-2324, 1998.), (b) is the classification accuracy of Bag-of-Feature based method (R. Xu, Y. Hirano, R. Tachibana, and S. Kido, "Classification of diffuse lung disease patterns on high-resolution computed tomography by a bag of words approach," in International Conference on Medical Image Computing & Computer-assisted Intervention (MICCAI), 2011, p. 183.), (c) is the classification accuracy of a five layers' convolutional neural network (CNN-5) (M. Anthimopoulos, S. Christodoulidis, and et. al., "Lung pattern classification for interstitial lung diseases using a deep convolutional neural network," IEEE Transactions on Medical Imaging, vol. 35, no. 5, pp. 1207-1216, 2016.), (d) is the classification accuracy of a single residual network (ResNet-18) (Kaiming He, Xiangyu Zhang, and et. al., "Deep residual learning for image recognition," in Computer Vision and Pattern Recognition, 2016, pp. 770-778.); (e) is the classification accuracy of the invention method (DB-ResNet-18).

Confusion matrices of the invented method and other methods are in FIG. 6, where (a) is the confusion matrix of Bag-of-Feature based method; (b) is the confusion matrix of five layers' convolutional neural network (CNN-5); (c) is the confusion matrix of a single residual network (ResNet-18); (d) is the confusion matrix of the invention method (DB-ResNet-18).

The invention claimed is:

1. A method based on deep neural network to extract appearance and geometry features for pulmonary textures classification, wherein comprising the following steps:
   1) original data preparation: the original data includes CT image patches of pulmonary textures, corresponding image patches containing geometry information and corresponding category labels, for training, validation, and testing;
   2) construction of dual-branch residual network: based on skip-connection structure proposed in residual network, a dual-branch residual network with 18 layers is constructed;
   3) train the dual-branch residual network from step 2), wherein, the construction of the dual-branch residual network in the step 2) comprises the following steps:
      2-1) the constructed dual-branch residual network is composed of 18 layers, including 15 convolutional layers and 3 fully connected layers; a top branch uses appearance information in image as input, a bottom branch uses corresponding image patches containing geometry information as input;
      2-2) the skip-connection structure calculates the residual error between the input information and the information calculated by convolutional layer, through learning residual error by the network, the residual error is formulated as follows:

$y=F(x_i\{W_i\})+x$ in the formulation, y denotes final output result after convolutional layer, F denotes convolutional calculation function, x denotes input of the network, i denotes the index of convolutional layer with domain of definition set as [1,15], $W_i$ denotes the weight matrix of i-th convolutional layer obtained from training the network;
      2-3) the output of last convolutional layer of the top and bottom branches are directly concatenated after a max-pooling layer to fuse information of top and bottom branches;
      2-4) a max-pooling layer is utilized after the first and last convolutional layers; and
      2-5) the stride of 6-th, 10-th, and 10-th convolutional layers are set to be 2.

* * * * *